358-84 SR

3/22/83 XR 4,377,870

United States Patent [19]

Anderson et al.

[11] 4,377,870

[45] * Mar. 22, 1983

[54] ELECTRONIC AUDIENCE POLLING SYSTEM

[75] Inventors: Roy E. Anderson, Scotia; Richard L. Frey, Schenectady; James R. Lewis, Albany, all of N.Y.

[73] Assignee: General Electric Company, Schenectady, N.Y.

[*] Notice: The portion of the term of this patent subsequent to Sep. 15, 1982, has been disclaimed.

[21] Appl. No.: 971,703

[22] Filed: Dec. 21, 1978

[51] Int. Cl.³ .......................... H04B 17/00; H04J 3/14

[52] U.S. Cl. .................................... 455/2; 179/2 AS; 235/386; 340/504; 358/84

[58] Field of Search .................. 325/31, 309, 308, 44, 325/51, 64, 66, 67; 340/171 A, 502, 182, 504; 35/9 A-9 F, 48 R, 48 B; 179/2 AS; 235/51, 52, 54 F, 56, 386; 455/2, 3, 4, 5, 6, 67, 53; 358/84, 185

[56] References Cited

U.S. PATENT DOCUMENTS

| | | | |
|---|---|---|---|
| 2,427,670 | 9/1947 | Goldsmith | 325/31 |
| 3,144,647 | 8/1964 | Sichak | 325/154 |
| 3,299,355 | 1/1967 | Jenks | 325/31 |
| 3,318,517 | 5/1967 | Wells | 455/2 |
| 3,500,559 | 3/1970 | Jones | 35/48 |
| 3,947,669 | 3/1976 | Simmons | 325/51 |
| 4,149,144 | 4/1979 | Diefenderfer | 340/147 R |
| 4,151,370 | 4/1979 | Root | 179/2 AS |
| 4,290,141 | 9/1981 | Anderson et al. | 455/2 |

*Primary Examiner*—Tommy P. Chin
*Attorney, Agent, or Firm*—Geoffrey H. Krauss; James C. Davis, Jr.; Marvin Snyder

[57] ABSTRACT

An audience polling system includes a plurality of wireless transmitters, each transmitter capable of transmitting a pulse of electromagnetic energy on a selected one of a group of predetermined frequencies. Each frequency selected on which to transmit corresponds to one of a group of suggested responses to a given stimulus. The polling system includes a receiver for receiving the transmitted pulses and electronic counters for tallying the number of pulses received on each of the selected frequencies. An electronic display presents the results of the tallying for observation by the audience or others.

28 Claims, 6 Drawing Figures

ELECTRONIC AUDIENCE POLLING SYSTEM

BACKGROUND OF THE INVENTION

This invention relates to audience participation systems, and more particularly, to wireless audience polling systems which allow the questioned person to assume various locations within the audience, that is, not being constrained to remain at stationary voting stations within the audience.

DESCRIPTION OF THE PRIOR ART

For instructional, business, entertainment and other purposes, it is often desirable to poll an assembled group of people with specific questions and suggested answers thereto to ascertain the consensus of the audience with regard to relevant topics. Typically, in prior voting sytems, a group of people may be assembled in an auditorium and situated at seats each equipped with a voting unit. When interrogated by an instructor, lecturer or master of ceremonies, for example, each person indicates his affirmative or negative response on his voting unit which is in communication with a central tallying machine via hard wire electrical lines connected to each voting unit. Alternatively, some prior audience participation systems have included voting units which could register several different suggested responses to given questions. However, in such systems an attendant increase in the number of hard wire lines connecting the individual voting units and the central tallying machine usually results.

The present invention concerns an electronic audience polling system which requires no hard wire connections between voting stations and a central tallying apparatus. As a result, the improved audience polling system provides greater flexibility than hard wired systems since it can be easily moved from one location to another and does not require extensive wiring each time it is relocated.

It is one object of this invention to provide an audience polling system which is portable.

Another object of this invention is to provide an audience polling system which allows the polled person to assume a variety of locations at the place where the questions are presented.

These and other objects of the invention will become apparent to those skilled in the art upon consideration of the following description of the invention.

BRIEF SUMMARY OF THE INVENTION

The present invention is directed to increasing the flexibility of audience polling systems. Each person, within an audience to be questioned is provided with a small, portable transmitter. Each transmitter is capable of generating a pulse of electromagnetic energy on any one of a plurality of selected frequencies. Each of these selected frequencies corresponds to one of a group of suggested answers supplied by the person presenting a question to the audience. The audience is instructed to register their responses on the voting units during a preselected period of time. A receiver is provided for receiving the pulses thus transmitted by the questioned persons and is actuated to receive pulses during this preselected period of time. The receiver includes a plurality of logic outputs, each output respectively corresponding to one of the plurality of frequencies. Each of these outputs provides a logic pulse signal each time an electromagnetic pulse of the selected frequency to which that respective output corresponds is received by the receiver.

The audience polling system includes a plurality of counters for tallying the number of pulses generated at the receiver outputs. The input of each counter is respectively connected to a separate one of the outputs of the receiver. An electronic processor is connected to the outputs of the counters to provide display signals, representative of the number of pulses generated at each receiver logic output, to an electronic display such that the display signals are exhibited for observation of the audience's response to each of the suggested answers. In some embodiments of the invention, the electronic processor further provides display signals representative of the total number of pulses generated at all the logic outputs and display signals representative of the percentage of this total generated at each of the logic outputs.

To reduce the possibility that electromagnetic pulses on the same frequency representing the same answer may be sent out at the same time by two or more audience participants, thus undesirably resulting in two or more of the electromagnetic pulses overlapping and being counted as only a single pulse, one embodiment of the invention contemplates use of a time delay circuit in each of the transmitters. The time delay circuit functions such that the time at which an electromagnetic pulse is transmitted by each unit occurs after a selected amount of time has transpired from the time of actuation of the transmitter. The length of this delay is selected to vary randomly from transmitter to transmitter, but is fixed for each respective transmitter.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DESCRIPTION OF THE PREFERRED EMBODIMENTS

Figure 1:
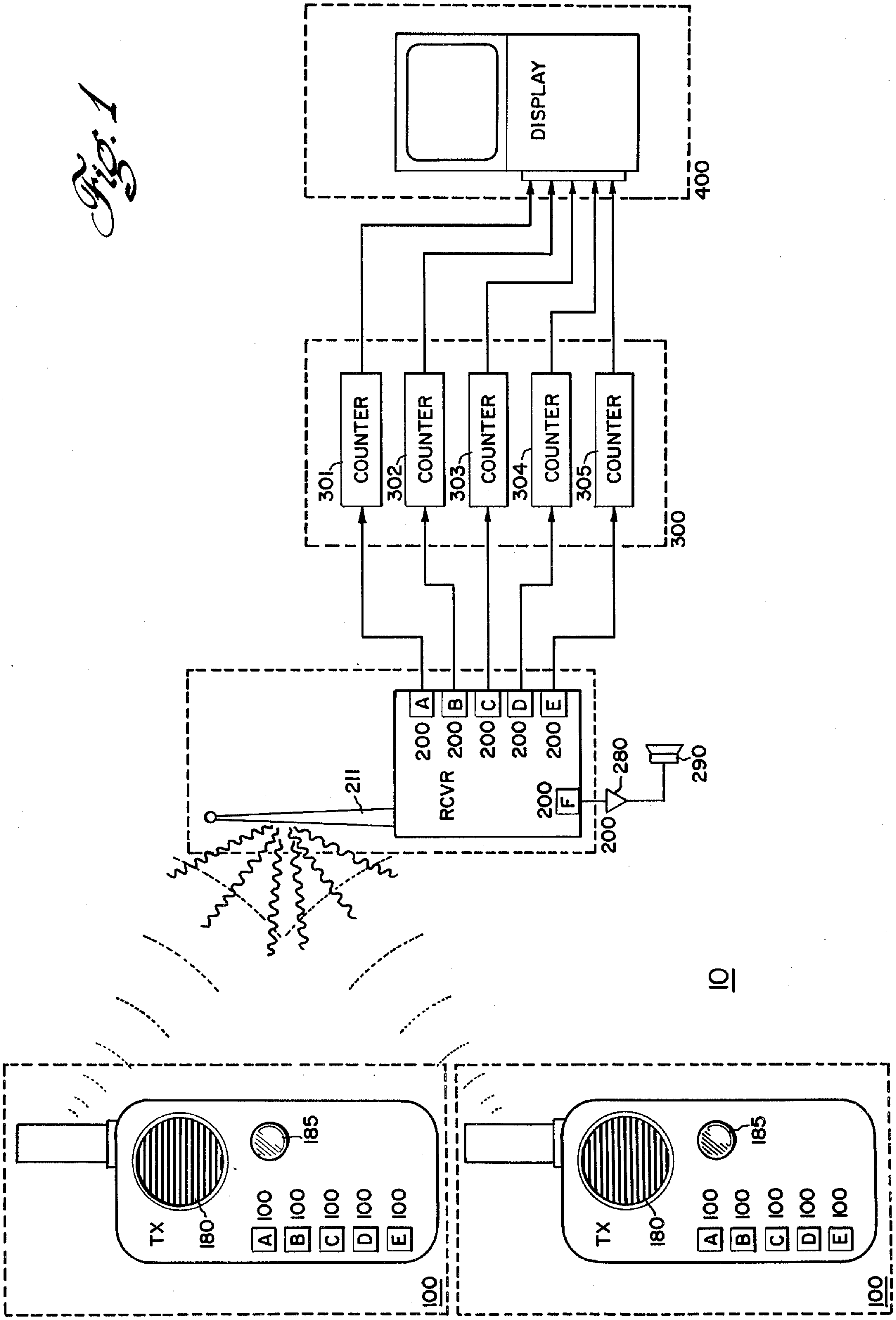
FIG. 1 is a block diagram of one embodiment of the audience polling system of the invention.

FIG. 1 illustrates one embodiment 10 of the electronic audience polling system of the invention. An audience which is to use system 10 is assembled at a desired location, either indoors or outdoors. Each person to be questioned in the audience is provided, respectively, with a separate one of a plurality of battery-powered transmitters 100. Each one of transmitters 100 includes a plurality, such as five, user-actuable switches 100A, 100B, 100C, 100D and 100E. When one of these switches is actuated, a pulse of electromagnetic energy is transmitted; the frequency of this pulse is determined by which of the switches is actuated. For example, actuating one of switches 100A, 100B, 100C, 100D or 100E causes a pulse to be transmitted on a frequency of 545, 550, 555, 560 or 565 Megahertz, respectively. Other frequencies may, of course, be used. This pulse of electromagnetic energy, hereby termed a "polling pulse", is of short duration, such as 10 microseconds, for example.

Transmitters 100 are used to communicate to a master receiver 200 the polled persons' responses to a given question. By way of illustration, a lecturer presents a statement to the audience and communicates to them a group of suggested responses conveniently labeled A, B, C, D and E. Response A may be Strongly Agree, B-Agree, C-Undecided, D-Disagree and E-Strongly Disagree. Other responses may of course be associated with choices A-E, according to the preference of the interrogating person, such as multiple choice answers to questions. Each response, by actuation of the appropriate switch on transmitter 100, causes transmission of the above-described electromagnetic pulse on the selected frequency corresponding to that response. When the entire audience is thus questioned, each member of the audience chooses one of the answers A-E and actuates the appropriate switch on his respective transmitter 100 according to his individual choice of answer. The questioned persons are given a "response period", that is, a fixed period of time, for example, 10 seconds, in which to register their responses on their respective transmitters 100. Assuming the audience chooses a wide variety of answers, several polling pulses will be transmitted on each of the five frequencies set forth above. It is probable that very few of the polling pulses on the same frequency will overlap in time because of the short duration of the pulse and the somewhat random manner in which each questioned person chooses to respond (that is, actuate the transmitter) with respect to the other questioned persons. It is desirable that pulses overlapping in time be avoided because, when received by receiver 200, overlapping pulses may undesirably be interpreted as a single pulse. If such overlapping occurs, voting information is lost.

In the embodiment shown in FIG. 1, master receiver 200 comprises in part a radio frequency input 211 adapted to receive the selected frequencies on which polling pulses are transmitted by transmitters 100. Input 211 is connected to a receiving antenna 212 having dimensions appropriate to the selected frequencies at which reception is desired. Receiver 200 includes five digital outputs, 200A, 200B, 200C, 200D and 200E, that is, one output for each of the selected frequencies on which polling pulses are transmitted by transmitters 100. Thus, a pulse corresponding to answer A, when transmitted on a frequency of 545 Megahertz by one of transmitting units 100, is received by receiver 200 which momentarily produces a logic output signal (a voltage high, for example) at output 200A. Similarly, pulses transmitted corresponding to answers B through E each result in logic output signals at receiver outputs 200B through 200E, respectively. Thus, for each polling pulse received by receiver 200, an output logic pulse is produced at the appropriate receiver logic output corresponding to the frequency of that particular input pulse.

Typically, master receiver 200 is positioned in relatively close proximity to the plurality of transmitting units 100. For example, when the audience polling system 10 is deployed in an auditorium, master receiver 200 satisfactorily receives polling pulses from transmitting units 100 positioned 25–50 meters from transmitting units 100 when the effective radiated power of each transmitting unit 100 is typically 10 milliwatts. Somewhat higher and lower effective radiated powers are acceptable depending upon the particular system application in terms of rate of battery drain in transmitting units 100 and distance between units 100 and receiver 200.

Audience polling system 10 further includes a counter bank 300. Counter bank 300 includes a plurality of electronic counters 301, 302, 303, 304 and 305, respectively connected to the digital outputs 200A, 200B, 200C, 200D and 200E of receiver 200. Each counter performs the function of electronically tallying the number of logic pulses received on its input and produces the counted total in a suitable signal format on its output.

The outputs of the counters of counter bank 300 are connected to a suitable display 400. In one embodiment display 400 comprises seven-segment LED, gas discharge or liquid crystal readouts to display the total number of pulses counted by each of the counters of counter bank 300. Alternatively, one or more cathode ray tube devices may be used as display 400. The response of the audience to questions posed to them is thus shown for observation by the interrogating person, the audience or other observers. For applications in which the audience is to observe its response, it is desirable that display 400 be sufficiently large that the audience may readily see the results of the polling. Display 400, in the latter instance, conveniently comprises a large screen video projector of the type commercially available from General Electric Company, Television Business Department, Syracuse, New York.

The polling system of the invention is not limited to providing five choices of suggested answers. Fewer or more choice elections may be provided by appropriately varying the number of frequencies on which polling pulses are transmitted.

Figure 2:
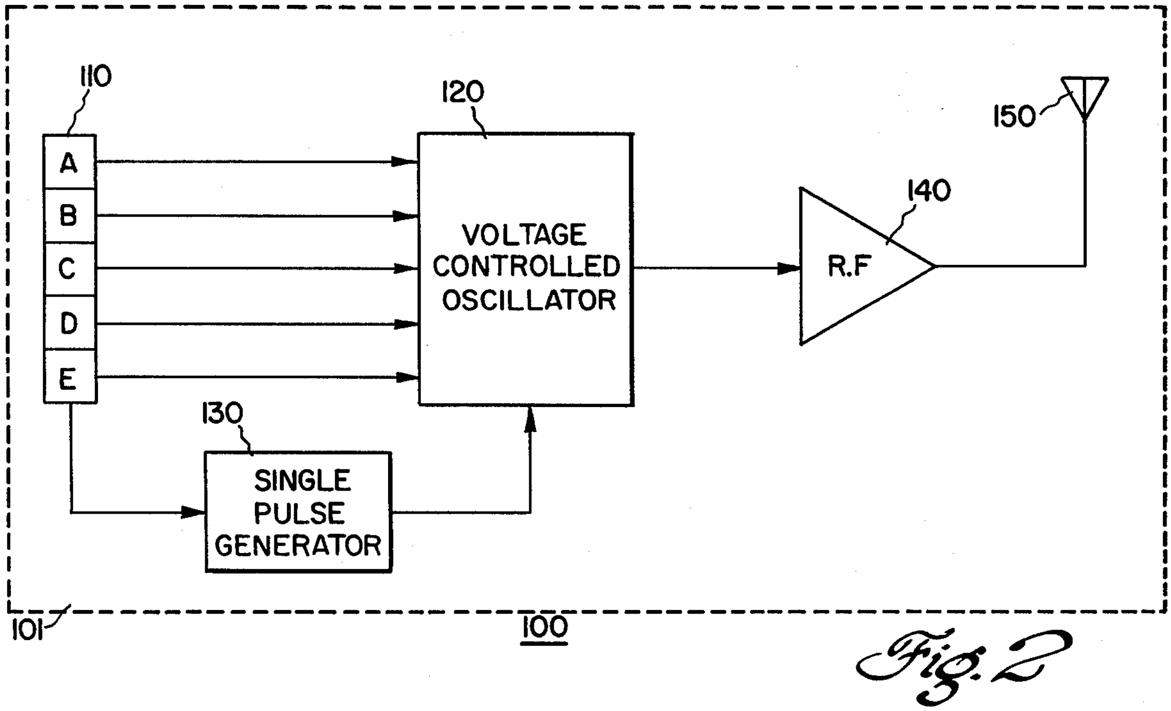
FIG. 2 is a simplified block diagram of a transmitter employed in the audience polling system of the invention.

FIG. 2 is a simplified block diagram of one of transmitters 100, which includes a group of five user actuable switches 110 conveniently labeled A, B, C, D and E to denote each of the suggested answers posed to the audience. The transmitter further includes a voltage controlled oscillator or VCO 120. Switch group 110 is operatively connected to the frequency control portion of VCO 120 in such a manner that when any one of switch group 110 is activated, VCO 120 is actuated to oscillate at a predetermined unique frequency representing activation of that particular switch. Switch group 110 is connected to a pulse generator 130 which produces a single output voltage pulse when any one of switch group 110 is activated. The output of generator 130 is coupled to the power supply input of VCO 120 such that any voltage pulse produced thereby enables VCO 120 to be turned on and oscillate at the frequency preset by the choice of switch group 110. The duration of the pulse generated by pulse generator 130 may be in the range of 1 to 100 microseconds, for example, but a convenient value of 10 microseconds has been found to be effective. The output of VCO 120 is coupled to the input of an RF amplifier 140, the output of which is coupled to an antenna 150 of suitable dimensions to radiate efficiently the frequencies on which transmitter 101 is selected to operate.

Transmitter 100 is turned on when one of switch group 110 is actuated and is automatically turned off for a selected period of time after this time such that a polled person cannot transmit more than one polling pulse per response period.

Figure 3:
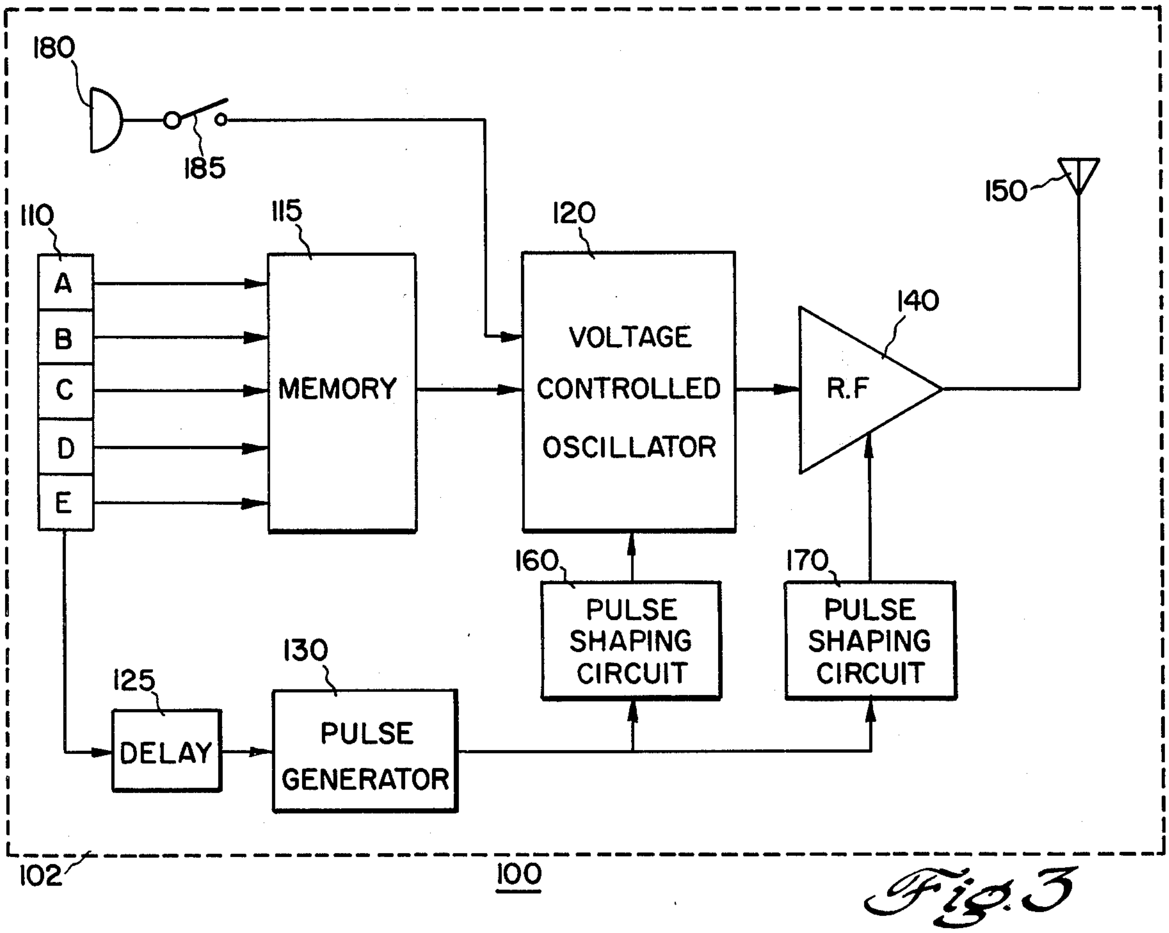
FIG. 3 is a block diagram of an alternative transmitter which may be employed in the audience polling system of the invention.

FIG. 3 illustrates an alternative embodiment 102 of transmitter 100, wherein like numerals indicate like components, which incorporates a time delay circuit 125 to substantially reduce the possibility that pulses transmitted on the same frequency by some of the transmitters 102 will overlap in time. Transmitter 102 includes a basic memory 115 between switch group 110 and VCO 120 and a time delay circuit 125 between switch group 110 and pulse generator 130. Pulse generator 130 is coupled to the power supply activation lines of VCO 120 and RF amplifier 140 through pulse shaping circuits 160 and 170, respectively.

In transmitter 102, each of the switches of switch bank 110 is connected to memory 115 which comprises a group of simple latch circuits, for example. Each switch of switch bank 110 is respectively connected to a separate latch circuit in memory 115, such that when one of switches A-E of switch group 110 is activated, the latch circuit preserves the fact of this selection after the switch is deactivated to its neutral position. Memory 115 is operatively connected to the input frequency control portion of VCO 120 such that when one of the latch circuits of memory 115 closes and remains closed or latched, the appropriate frequency of VCO 120 is selected corresponding to the particular switch of switch group 110 that has been activated. The six latch integrated circuit 74C174 available from National Semiconductor Corp. and Motorola is conveniently used to implement memory 115.

Time delay circuit 125 functions to prevent transmission of the polling pulse from occurring at the instant one of the switches of switch group 110 is actuated. The time of transmission is conveniently delayed by a selected interval in the range of zero to three seconds, for example, in each transmitting unit. This reduces the likelihood of two or more polling pulses overlapping in time during transmission to receiver 200. A longer time delay may be used to further decrease the possibility of polling pulse overlap. The amount of the time delay is fixed for each of the transmitters of the sample group of 100, however, the amount of time delay varies from transmitting unit to transmitting unit in a random manner. The delayed pulse signal generated by actuating any one of the switches of switch group 110 appears at the output of pulse generator 130 and is coupled to the power supply activation lines of VCO 120 and RF amplifier 140 by pulse shaping circuits 160 and 170, respectively. The pulse at the output of pulse shaping circuit 160 thus activates VCO 120 by causing it to be supplied with power supply voltage, enabling VCO 120 to produce a pulse of the desired duration and selected frequency at its output. The output produced by VCO 120 is increased in amplitude by RF amplifier 140. The pulse generated at the output of pulse shaping circuit 170 is applied to the power supply line of RF amplifier 140, turning on the amplifier while the pulse is present. Pulse shaping circuits 160 and 170 shape the pulse received at their respective inputs such that it does not rise and fall abruptly and cause VCO 120 and RF amplifier 140 to be turned abruptly on and off. Such abrupt turn-on and turn-off can result in spurious signals being generated on frequencies other than those of the desired polling pulse frequency. For example, pulse shaping circuits 160 and 170 shape each pulse conveniently generated by generator 130 into an approximation of a cosinesquared waveform which has somewhat gently sloping rise and decay times. Other waveforms with characteristics similar to those just described would be acceptable. The output pulse of RF amplifier 140 is supplied to transmitting antenna 150.

A 10 microsecond duration polling pulse results in minimal overlap of polling pulses. If desired, the time duration of the polling-pulse may be less than 10 microseconds to further reduce the possibility of polling pulse overlap, and may be more than 10 microseconds provided it is not so large as to significantly increase the possibility of polling pulse overlap.

In summary, the possibility of polling pulse overlap occurring when using transmitters 102 is relatively small because of the time delay resulting from activation of the switches of switch group 110, the short time duration of each polling pulse, and the relatively random manner in which the members of the participating audience activate their respective transmitting units during the allocated response time period while receiver 200 is activated to to receive polling pulses.

A public address feature may be conveniently included in polling system 10 by coupling a microphone 180 to transmitter 102. Audio frequency signals from microphone 180 frequency modulate VCO 120 at a selected carrier frequency generally different from that of the selected frequencies corresponding to switches A–E of switch group 110. The polled person closes switch 185 and speaks into microphone 180, causing a frequency modulated signal to be transmitted at antenna 150 and received by receiver 200 which detects and amplifies the voice signal for public address to the audience. FIG. 1 shows receiver 200 including an audio output 200F coupled to an audio amplifier 200 which is coupled to a loudspeaker 210 to accomplish this function.

Figure 4:
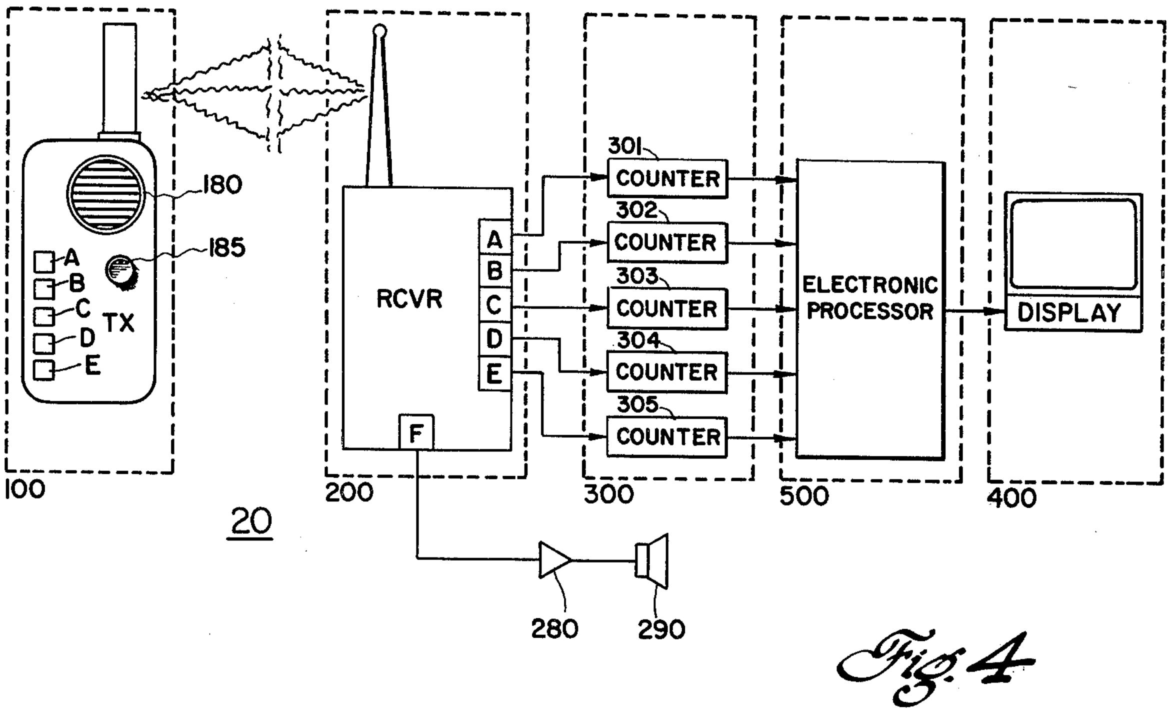
FIG. 4 is a block diagram of an alternative embodiment of the audience polling system, including an electronic processor.

An audience polling system 20 is illustrated in FIG. 4. System 20 is substantially similar to system 10 described above except that an electronic processor 500 is included in system 20 to manipulate the counted votes and place them in a format which better presents the audience's response. Electronic processor 500 is coupled to the outputs of the counters of counter bank 300 to receive data indicating the approximate total number of votes cast for each of the suggested answers. Electronic processor 500 conveniently includes an algorithum to total the number of votes received, determine the percentage of votes which were cast for each of the respective answers A through E and determine the consensus response. The output of electronic processor 500 is coupled to the input of display 400 to provide the display with the audience's processed response. Acceptable electronic processors are such general purpose microprocessors as the Intel 8080, Intel 8085 and the Zilog Z80 which are all single chip eight-bit microprocessors. Other electronic processors which may be used for processor 500 are such minicomputers as the PDP-8 and PDP-11 manufactured by the Digital Equipment Corporation.

Figure 5:
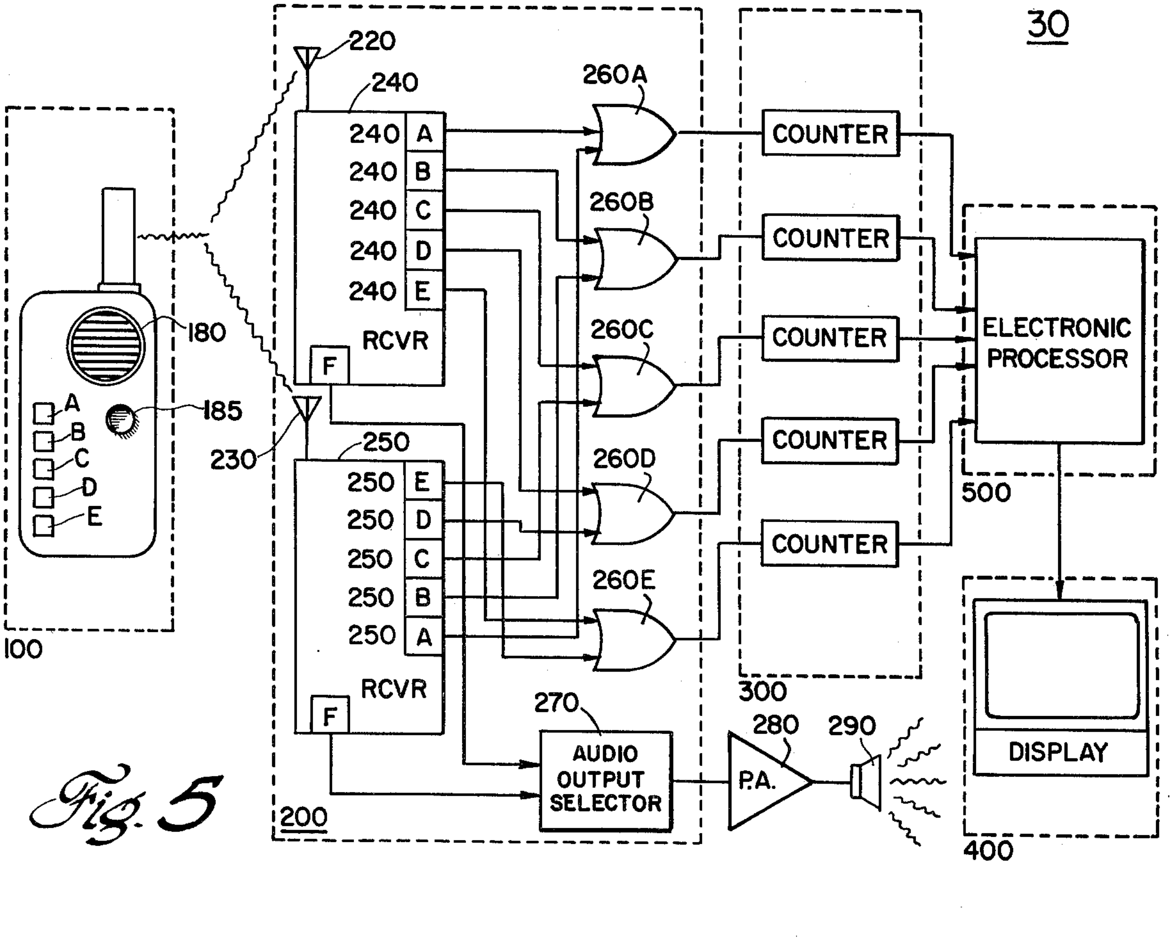
FIG. 5 is a block diagram of another alternative embodiment of the audience polling system of the invention, including two receivers to provide space diversity reception.

Another embodiment of the audience polling system of the invention is shown in FIG. 5 as polling system 30. Polling system 30 is substantially similar to polling system 20 shown in FIG. 4 except that instead of a single receiver 200 a pair of receivers 240 and 250 are employed in a space diversity reception configuration to achieve better reception of the polling pulses transmitted by transmitting units 100. In locations such as auditoriums, for example, in which the audience polling system of the invention would commonly be used, multipath reception problems may be encountered by a single master receiver 200 when used in the configuration shown in FIG. 4; that is, signals transmitted by the transmitting units 100 arrive at master receiver 200 having traversed more than one signal path each. An electromagnetic pulse transmitted by any one of transmitting units 100 thus supplies the immediately surrounding area with an electromagnetic field not of uniformly declining field strength (intensity) with distance, but rather with a series of peaks and nulls in the field.

Space diversity reception, that is the usage of multiple receiving antennae and multiple receivers in various separated locations to receive the same signal, can be implemented to successfully overcome the multipath problem, in the manner shown in FIG. 5. Master receivers 240 and 250 each includes receiving antennae 220 and 230, respectively, positioned a substantial difference from each other and at convenient locations in close proximity to where the transmitting units 100 are deployed. Each antenna is of a size and configuration adapted to receive the pulse transmissions of the various transmitting units 100 and may be connected to its associated receiver through coaxial cable. Each receiver 240 and 250 is substantially similar to receiver 200 described above in the discussion of FIG. 1. As shown in FIG. 5, receiver 240 includes logic outputs 240A, 240B, 240C, 240D and 240E. Similarly, receiver 250 includes logic outputs 250A, 250B, 250C, 250D and 250E. Each of these logic outputs provides a digital pulse when a polling pulse is received on the frequency corresponding to that digital output. In this embodiment, electronic "OR" circuits 260A, 260B, 260C, 260D and 260E are included. For each of the selected frequencies on which polling pulses are transmitted, a pair of two separate logic output ports are provided, one on each of receivers 240 and 250, respectively. Each logic output of each pair of logic outputs of receivers 240 and 250 is respectively connected to a separate input of a corresponding electronic OR circuit respectively. For example, logic outputs 240 and 250 are connected to the inputs of electronic OR 260A; logic outputs 240B and 250B are connected to the inputs of electronic OR 260B, and so forth. The output of each of electronic OR circuits 260A through 260E is respectively connected to one of the counters of counter bank 300. Thus if a reception problem causes a null in polling pulse signal to appear at one of antennae 220 and 230, it is highly probable that the remaining antenna will receive the same polling pulse at a signal level sufficient to be detected by receiver connected thereto.

Receivers 240 and 250 each detect incoming voice signals on a frequency preferably, although not necessarily, distinct from that on which the polling pulses are transmitted. Receivers 240 and 250 respectively include audio outputs 240F and 250F at which the detected audio signals are present. Audio outputs 240F and 250F are connected to respective inputs of an audio output selector 270. Selector 270 receives the two audio signals so provided and produces the stronger of the two at its output, which is coupled to the input of a public address amplifier 280. Public address amplifier 280 is connected to an electro-acoustic transducer 290 which broadcasts the amplified audio signal to the audience. Each person equipped with a transmitting unit 100 may thus publicly address the audience via audience polling system 30.

Figure 6:
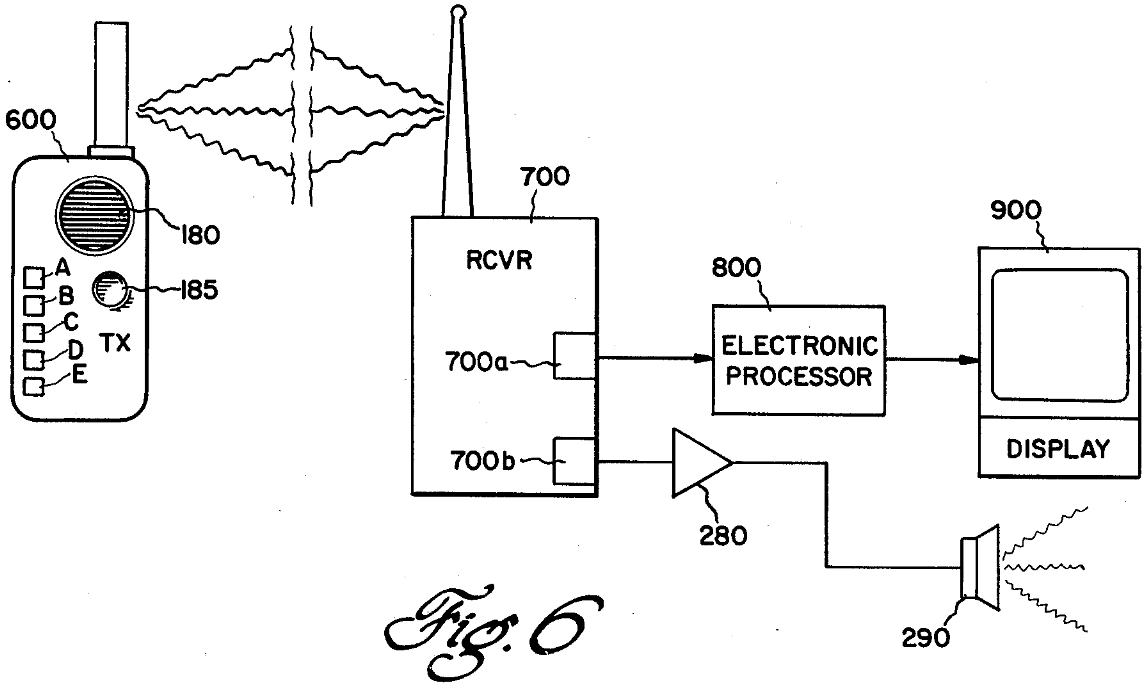
FIG. 6 is a block diagram of another alternative embodiment of the audience polling system of the invention in which digitally coded pulse sequences are employed.

Another embodiment of the audience polling system of the invention is shown in FIG. 6 as system 40. Polling system 40 includes a plurality of transmitting units 600, one transmitting unit being provided to each one of the polled persons in the audience. Transmitting units 600 each include a bank of switches A through E, which correspond, respectively, to suggested answers A through E as in the previously discussed embodiments. A different digitally coded pulse sequence is employed to correspond to each of responses A through E, respectively. When any one of switches A through E is manually actuated, the corresponding digital code sequence is superimposed on an electromagnetic carrier signal of predetermined frequency. This superimposition (or modulation) can take the form of amplitude, frequency or phase modulation. Thus, when questioned, the members of the audience each activate their respective transmitters by registering their selected choice of answers A through E, collectively causing a plurality of digitally coded pulse sequences to be transmitted. Because transmitters 600 all transmit digitally coded pulse sequences on a single frequency, excessive use of frequency spectrum is avoided.

The time duration of each transmitted pulse sequence is limited to a selected small value, for example, 25 microseconds, resulting in low likelihood that such overlapping of transmitted pulse sequences from the plurality of transmitting units 600 may result. Consequently, there is little likelihood of answer coded sequences overlapping with attendant loss of coded sequence information. An electronic time delay circuit having characteristics like that of time delay circuit 125 discussed above under FIG. 3 is included in transmitter 600 to further reduce the possibility of pulse sequence overlap. The time duration of the pulse sequences may be more than 25 microseconds providing it is not so long that pulse sequence overlap causes substantial loss of pulse sequence information and less than 25 microseconds providing it is long enough to be detectable.

The digitally coded pulse sequences may additionally comprise "error correcting codes" to reduce the undesirable effects of noise and pulse sequence overlap. In the particular embodiment of the invention set forth above in which five different answers may be selected, five different pulse sequences must be provided to allow indication of these answers. Thus, each pulse sequence is comprised of at least three bits to convey this answer selection information. The use of error correcting codes, whereby an excess number of bits is used beyond that number of bits needed to communicate the desired information, is well known in the art.

System 40 includes a receiver 700 capable of receiving the plurality of pulse sequences transmitted by transmitters 600. Receiver 700 is situated sufficiently close to transmitting units 600 to assure reception of pulse sequences with adequate signal quality. As in the embodiment of the polling system shown in FIG. 5, receiver 700 may comprise a space diversity reception arrangement to minimize the undesirable effects of multipath signals.

An electronic processing circuit 800 is operatively coupled to the digital output 700*a* of receiver 700. Electronic processor 800 thus receives the answer coded pulse sequences and determines the total number of pulse sequences received corresponding to each of the respective possible answers A through E. Display signals representative of the number of pulse sequences received corresponding to each of these possible answers are produced by electronic processor 800. Electronic processor 800 may simply tally the number of responses for each of these possible answers. Further, processor 800 can function to determine the respective percentages of the total number of responses received, which are cast for each of the respective possible answers. Other statistical information regarding the audience's response may be calculated as desired.

An electronic display 900 is operatively connected to electronic processor 800 to display the data produced by processor 800 to show the audience's response for observation and comparison purposes.

Transmitters 600 each include a wireless microphone 180 actuated by a switch 185 for transmitting voice comments of the audience to receiver 700. Wireless microphone 180 transmits on a frequency preferably although not necessarily distinct from that on which the digitally coded pulse sequences are transmitted. Receiver 700 detects voice transmissions from transmitters 600 and provides the detected output at output 700*b*. Output 700*b* is coupled to amplifier 200 which amplifies the detected voice comments and provides them to a loudspeaker 285 for broadcast to the audience.

The foregoing describes an audience polling system which allows an audience to be questioned as individuals and respond collectively via portable transmitting units from which their responses may be communicated. A master receiver receives the transmitted responses of the audience and an electronic processor compiles these responses into a format suitable for presentation to the audience or other observers by an appropriate electronic display.

While only certain preferred features of the invention have been shown by way of illustration, many modifications and changes will occur to those skilled in the art. It is, therefore, to be understood that the present claims are intended to cover all such modifications and changes as fall within the true spirit of the invention.

What is claimed is:

1. An electronic polling system for determining the consensus of an audience to a given stimulus with a plurality of suggested responses, said system comprising:

a plurality of transmitting means, each transmitting means capable of generating a pulse of electromagnetic energy of any one of a common plurality of selected different radio frequencies, each of said selected frequencies corresponding to one of the suggested responses, the number of transmitting means equal to the number of persons to be polled in said audience with each transmitting means generating one of said pulses solely when activated by the associated audience member;

receiving means including an input for receiving said electromagnetic pulses and for providing at each of a plurality of logic outputs, each respectively corresponding to one of said selected radio frequencies, a logic pulse signal each time one of said electromagnetic pulses is received at the selected radio frequency to which said respective output corresponds:

a plurality, equal in number to the number of said plurality of logic outputs, of counting means for totalling the number of said logic pulse signals generated at each of said logic outputs, each counting means being respectively responsive only to an associated different one of said plurality of logic outputs; and electronic display means responsive to said counting means, for displaying data representative of the total number of pulses counted by each of said counting means such that the number of each of said suggested responses by the audience may be ascertained.

2. The electronic polling system of claim 1 wherein each of said transmitting means includes a plurality of switches, each switch corresponding to one of the suggested responses and responsive only to actuation thereof at the associated transmitter for causing said pulse of electromagnetic energy to be transmitted.

3. The electronic polling system of claim 2 wherein each of said transmitting means includes pulse transmission delay means for delaying the time of transmission of said pulse from the time for actuation of said switch by a different randomly selected and fixed amount for each transmitting means.

4. The electronic polling system of claims 1 or 3 wherein said receiving means comprises two spatially separated receiving antennae with first and second radio frequency receivers operatively connected respectively thereto, each of said first and second receivers having said plurality of separate logic outputs each corresponding to one of said selected radio frequencies; and means responsive to each one of the respective outputs of said first receiver and to each corresponding one of the respective outputs of said second receiver for providing to said counting means a logic pulse signal when a corresponding logic output of at least one of said first and second receivers is present.

5. The electronic polling system of claim 2 wherein said transmitting means includes a wireless microphone to transmit voice comments from persons in the audience via a modulated electromagnetic wave having a selected carrier frequency and wherein said receiving means includes audio detecting means responsive to said modulated electromagnetic wave and rendering audible said voice comments at a suitable audio level.

6. An electronic polling system for determining the consensus of an audience to a given stimulus with a plurality of suggested responses, said system comprising:

a plurality, equal to the number of persons to be polled in said audience, of means each for transmitting a pulse of electromagnetic energy on that one frequency, chosen by an individual member of the audience, of a common plurality of selected frequencies, each of said selected frequencies corresponding to one of the suggested responses;

means for receiving said electromagnetic pulses and having a plurality of logic outputs each corresponding to a respective one of said selected frequencies, each of said outputs providing a logic pulse signal each time one of said electromagnetic pulses is received at the selected frequency to which said respective output corresponds;

a plurality of counting means each for totalling the number of said logic pulse signals generated at an associated one of said logic outputs;

electronic processing means responsive to said counting means for providing display signals representative of the number of logic pulse signals generated at each of said logic outputs, and electronic display means for displaying said display signals and operatively coupled to said electronic processing means such that the number of each of said suggested responses by the audience may be ascertained.

7. The electronic polling system of claim 6 wherein each of said transmitting means includes a plurality of switches, each switch corresponding to one of the suggested responses and, upon actuation thereof, causing said pulse of electromagnetic energy to be transmitted at the particular radio frequency selected for the chosen response.

8. The electronic polling system of claim 7 wherein each of said transmitting means includes pulse transmission delay means for delaying the time of transmission of said pulse from the time of actuation of said switch by a different randomly selected and fixed amount for each transmitting means.

9. The electronic polling system of claims 6 or 8 wherein said receiving means comprises two spatially separated receiving antennae with first and second radio frequency receivers operatively connected respectively thereto, each of said first and second receivers having said plurality of separate logic outputs each corresponding to one of said selected radio frequencies; and means responsive to each one of the respective outputs of said first receiver and to each corresponding one of the respective outputs of said second receiver for providing to said counting means a logic pulse signal when a corresponding logic output of at least one of said first and second receivers is present.

10. The electronic polling system of claim 6 wherein said transmitting means includes a wireless microphone to transmit voice comments from persons in the audience via a modulated electromagnetic wave having a selected carrier frequency different from the frequencies selected for transmitting responses; and wherein said receiving means includes an audio detecting means responsive to said modulated electromagnetic wave and rendering audible said voice comments at a suitable audio level.

11. The electronic polling system of claim 6 wherein said electronic processing means further includes totalling means for generating display signals representative of the total number of logic pulse signals generated at all of said logic outputs and the percentage of said total generated at each of said logic outputs.

12. The electronic polling system of claim 8 wherein said electronic processing means further includes totalling means for generating display signals representative of the total number of logic pulse signals generated at all of said logic outputs and the percentage of said total generated at each of said logic outputs.

13. The electronic polling system of claim 9 wherein said electronic processing means further includes totalling means for generating display signals representative of the total number of logic pulse signals generated at all of said logic outputs and the percentage of said total generated at each of said logic outputs.

14. The electronic polling system of claim 10 wherein said electronic processing means further includes totalling means for generating display signals representative of the total number of logic pulse signals generated at all of said logic outputs and the percentage of said total generated at each of said logic outputs.

15. A method for polling an audience to determine the consensus response of the audience to a given stimulus with a plurality of suggested responses, said method comprising:

presenting a stimulus with a plurality of suggested responses to said audience;

at least one member of the audience transmitting a pulse of electromagnetic energy on that one frequency chosen by each member of the audience from a plurality of selected radio frequencies, with each of said selected frequencies respectively corresponding to an associated one of said suggested responses;

counting the number of said pulses received on each individual one of said selected radio frequencies; and displaying, for observation and comparison purposes, the counted number of said pulses received on each individual one of said selected frequencies.

16. The method of claim 15 including the step of delaying, by a different randomly selected and fixed amount of time for each member responding, the transmission of said pulse of electromagnetic energy caused to be transmitted by each member of said audience.

17. A method for polling an audience to determine the collective response of the audience to a given stimulus with a plurality of suggested responses, said method comprising:

presenting a stimulus with a plurality of suggested responses to said audience;

at least one member of the audience transmitting a pulse of electromagnetic energy chosen by each member of the audience as that one frequency of a plurality of selected radio frequencies corresponding to a desired one of the suggested responses;

receiving said electromagnetic pulses;

counting the number of said pulses received on each of said selected radio frequencies;

electronically processing the respective count of said pulses received on each of said selected radio frequencies to generate display signals representative of the number of electromagnetic pulses respectively received on each of said selected radio frequencies; and electronically displaying said display signals for observation and comparison purposes.

18. The method of claim 17 wherein said electronic processing step includes the steps of comparing the number of said pulses received on each of said selected radio frequencies to find the consensus frequency on which the greatest number of pulses is transmitted; and generating a portion of said display signals corresponding to said consensus frequency to indicate the suggested answer which the questioned persons most often selected.

19. The method of claim 18 wherein the step of transmitting said pulse of electromagnetic energy by each member of said audience includes the step of delaying transmission by a different randomly selected and fixed amount of time for each member after each member has chosen the radio frequency to be transmitted.

20. The method of claim 18 wherein said electronic processing step includes the steps of generating display signals representative of the total number of digital pulses received; and generating other display signals representative of the percentage of said total number of digital pulse signals received on each of said selected frequencies.

21. The method of claim 19 wherein said electronic processing step includes the steps of generating display signals representative of the total number of digital pulses received; and generating other display signals representative of the percentage of said total number of digital pulse signals received on each of said selected frequencies.

22. An audience polling system for determining the collective response of an audience to a given stimulus with a plurality of suggested responses, said system comprising:

a plurality of means, each for selectively transmitting one of a group of distinctive digitally-coded pulse sequences modulated on an electromagnetic carrier wave of selected radio frequency and selected time duration, each different one of said group of pulse sequences representing a different one of the suggested responses;

receiving means for receiving a plurality of said pulse sequences, said receiving means being located an operable distance from said plurality of transmitting means;

electronic processing means operatively connected to said receiving means for providing display signals representative of the number of coded pulse sequences received corresponding to each of the suggested responses; and electronic display means for displaying said display signals such that the consensus response of the audience to a given question may be ascertained.

23. The audience polling system of claim 22 wherein each of said transmitting means includes a plurality of switches, each switch corresponding to one of the suggested responses and, upon actuation thereof, causing the corresponding digitally coded pulse sequence to be transmitted.

24. The audience polling system of claim 23 wherein each of said transmitting means includes pulse sequence transmission delay means for delaying the time of transmission of said selected pulse sequence from the time of actuation of said switch by a different randomly selected, and fixed amount for each transmitting means.

25. The audience polling system of claim 24 wherein the time duration of said selected pulse sequence is in the range of 10 to 100 microseconds.

26. The audience polling system of claims 22, 23 or 24 wherein said transmitting means includes a wireless microphone to transmit voice comments from persons in the audience via a modulated electromagnetic wave having a selected carrier frequency different from each of the frequencies selected for transmitting responses; and wherein said receiving means includes an audio detecting means responsive to said modulated electromagnetic wave and rendering audible said voice comments at a suitable audio level.

27. A method for polling an audience to determine the consensus response of the audience to a given stimulus with a plurality of suggested responses, said method comprising:

presenting a stimulus with a plurality of suggested responses to said audience;

at least one member of the audience transmitting, as modulation of an electromagnetic radio frequency carrier wave, that one of a plurality of different digitally coded pulse sequences each representing one of a like plurality of said suggested responses and chosen by each individual responding member of said audience;

receiving the pulse sequences of radio frequency energy transmitted by the audience;

counting within a preselected time interval the number of each of said plurality of different digitally coded pulse sequences received; and displaying, for observation and comparison purposes, indicia representative of the number of pulse sequences received corresponding to each of the selected responses.

28. The method of claim 27 wherein the transmission of said pulse sequences by each member of said audience is delayed by a different randomly selected and fixed amount of time for said each member.

* * * * *

UNITED STATES PATENT AND TRADEMARK OFFICE

CERTIFICATE OF CORRECTION

PATENT NO. : 4,377,870

DATED : March 22, 1983

INVENTOR(S) : Roy E. Anderson et al

It is certified that error appears in the above-identified patent and that said Letters Patent is hereby corrected as shown below:

Title page (*) Notice:, second line thereof, change "1982" to -- 1998 --.

Signed and Sealed this

*Nineteenth* Day of *July 1983*

[SEAL]

*Attest:*

GERALD J. MOSSINGHOFF

*Attesting Officer* *Commissioner of Patents and Trademarks*